(No Model.)
J. W. DAY.
HARROW.
No. 448,506.
Patented Mar. 17, 1891.
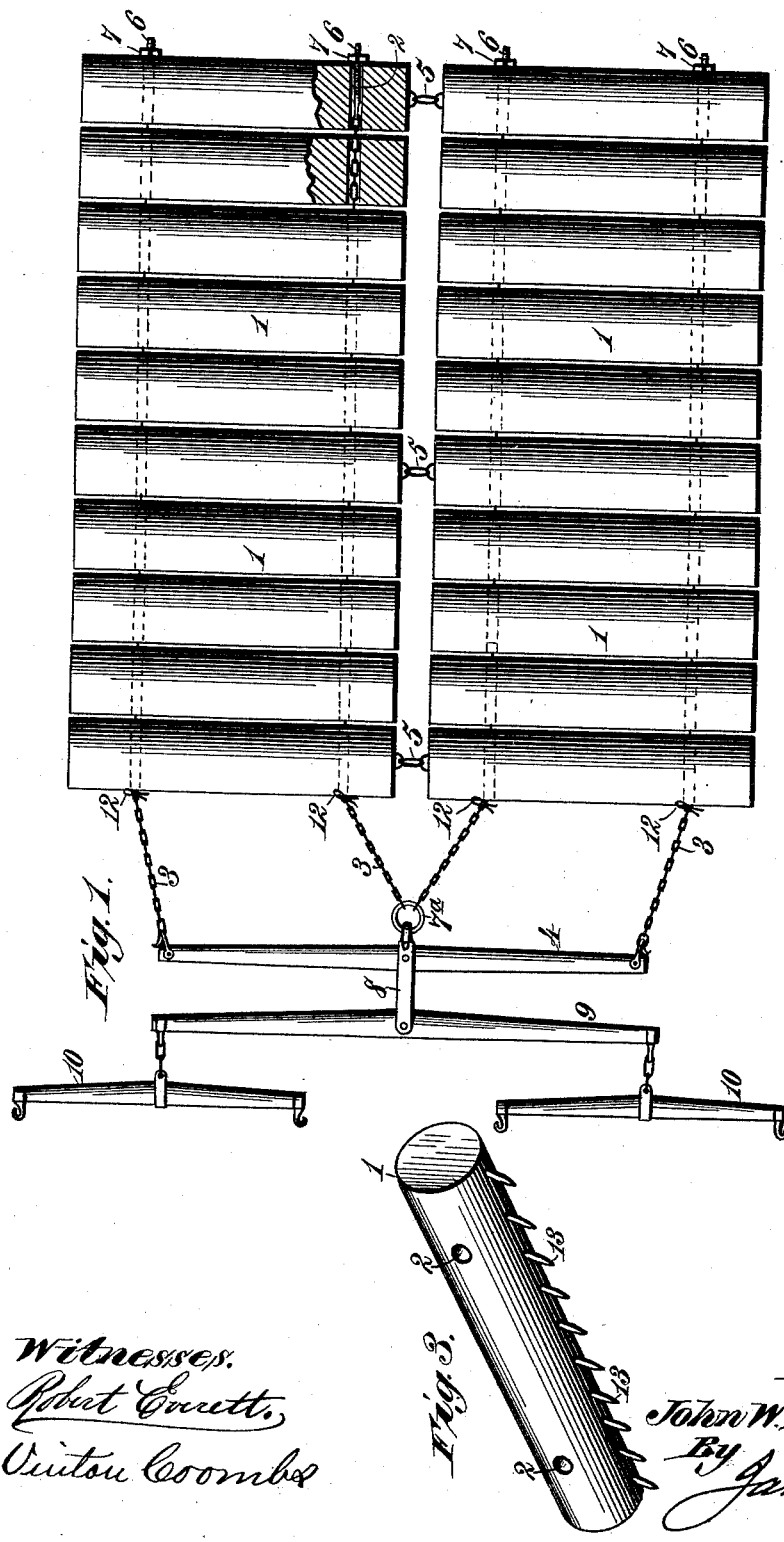
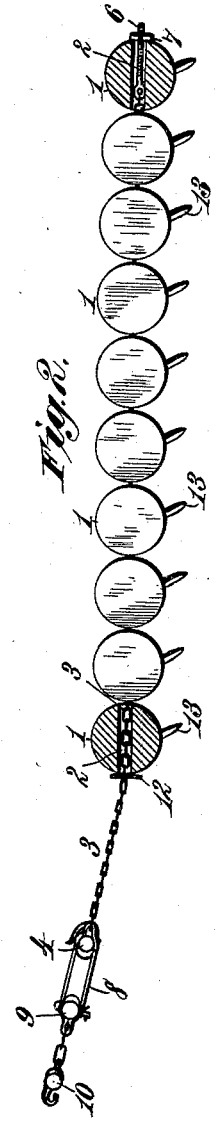
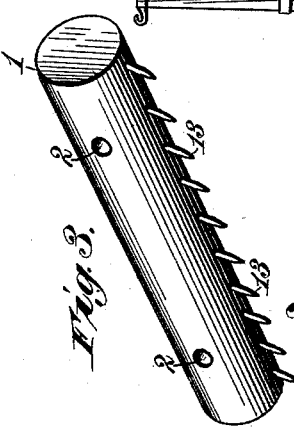
Witnesses.
Robert Errett,
Vinton Coombs
Inventor:
John W. Day.
By James L. Norris
Atty.

UNITED STATES PATENT OFFICE.

JOHN W. DAY, OF BAIRD, TEXAS.

HARROW.

SPECIFICATION forming part of Letters Patent No. 448,506, dated March 17, 1891.

Application filed September 25, 1890. Serial No. 366,148. (No model.)

*To all whom it may concern:*

Be it known that I, JOHN W. DAY, a citizen of the United States, residing at Baird, in the county of Callahan, State of Texas, have invented certain new and useful Improvements in Harrows and Pulverizers, of which the following is a full, clear, and exact specification.

This invention has for its object to provide a novel harrow, which is also adapted to be reversed for pulverizing and leveling the surface traversed, to avoid evaporation as far as possible, and place the ground in the best condition for the travel of harvesters and other machines in gathering crops. To accomplish this object my invention involves the features of construction, the combination or arrangement of devices, and the principles of operation hereinafter described and claimed, reference being made to the accompanying drawings, in which—

Figure 1 is a top plan view, partly in section, of my improved harrow and pulverizer. Fig. 2 is a sectional side elevation of the same, and Fig. 3 is a detail perspective view of one of the toothed cylinders or cylindrical bars.

In order to enable those skilled in the art to make and use my invention, I will now describe the same in detail, referring to the drawings, wherein—

The numeral 1 indicates two sets or gangs of cylindrical bars, those in each set being arranged parallel to each other in a horizontal or approximately horizontal plane, and provided near each end with transverse perforations 2, through which extend longitudinal chains or flexible cables 3, connected at their forward ends with a draft-bar 4. The two sets or gangs of cylindrical bars are flexibly coupled together at their adjacent end portions through the medium of link-hinges 5, in order that one of such gangs of cylindrical bars may rise and fall independent of the other to conform to the surface traversed. The rear extremities of the chains or cables on which the cylindrical bars are strung are each connected with a screw-threaded rod 6, located in the transverse orifices 2 of the rearmost bars, and provided with screw-nuts 7, by means of which the chains or cables may be loosened or tightened for the purpose of adjusting the bars to and from each other, the construction being such that all of the bars can be brought into superficial contact, if desired, or be permitted to separate to provide narrow spaces or channels between them. The two inside chains or cables 3 are brought together and engaged with a ring $7^a$, connected with the draft-bar 4, the latter having a clevis 8, to which the doubletree 9 is secured, such doubletree having a singletree 10 at each end. The outermost chains or cables 3 connect directly with the ends of the draft-bar, by which arrangement the harrow is perfectly balanced. The foremost cylindrical bars are prevented from working forward on the chains or cables by means of keys 12, extending through links of the chains and bearing against the foremost bars.

The harrow and pulverizer may be made in one or two sections, as desired, and may also be varied in size or weight by adding a greater or less number of cylindrical bars, or by constructing them longer or shorter; but I prefer two sets or gangs of cylindrical bars coupled together by hinges, as such construction is more convenient and desirable and produces the best results.

By flexibly connecting the two sets or gangs as described the gangs comprising the pulverizer and harrow can adjust themselves to the surface traversed, and besides, the sets or gangs can be separated and each section used independently for cultivating purposes.

The cylindrical bars are unobstructed on their surfaces opposite the line of inclined teeth 13, and therefore the implement can be readily reversed by turning it upside down, when the smooth surfaces opposite the teeth can be employed for pulverizing and leveling the harrowed ground, thereby placing the earth in the best possible condition for the travel of harvesters and other machinery in gathering crops. The teeth of the cylindrical bars serve to stir the earth, but in fresh-plowed ground, when only a level surface is desired, the surface of the harrow or pulverizer which is opposite the teeth is generally employed.

In practice I prefer to construct the cylindrical bars of hard timber about six inches in diameter, turned in true circles, and perfectly smooth, as this enables the harrow and pulverizer to operate smoothly in the best manner.

Having thus described my invention, what I claim is—

1. A harrow and pulverizer consisting of a series of parallel cylindrical bars provided near each end with transverse perforations, chains or cables on which the cylindrical bars are loosely strung so that all the bars can bodily slide along the length of the cables into and out of superficial contact with each other, and a transverse draft-bar with which the front ends of the chains or cables are connected, substantially as described.

2. A harrow and pulverizer consisting of a series of parallel cylindrical bars having harrow-teeth projecting from one surface, chains or cables on which the cylindrical bars are loosely strung so that all the bars can slide along the length of the chains into and out of superficial contact, the screw-rods connected with one extremity of the chains or cables and provided with screw-nuts for tightening and loosening all of the cylindrical bars, and a draft-bar connected with the front extremities of the chains or cables, substantially as described.

3. A harrow and pulverizer consisting of two independently rising and falling sets or gangs of cylindrical bars flexibly connected together by link hinges and each bar provided on one surface with a line of projecting harrow-teeth, and two pairs of parallel chains or cables connected with a draft-bar, and on which the two gangs of cylindrical bars are respectively strung, substantially as described.

4. A harrow and pulverizer consisting of two independently rising and falling sets or gangs of cylindrical bars flexibly connected together by link hinges and each bar provided with a line of harrow-teeth projecting from one surface thereof, two pairs of parallel chains or cables on which the cylindrical bars are loosely strung, and a screw-rod connected with one extremity of each chain or cable and provided with a screw-nut for the purpose of tightening and loosening the bars, substantially as described.

JOHN W. DAY.

Witnesses:
I. M. OWINS,
E. D. FOY.